United States Patent [19]

Bikson et al.

[11] Patent Number: 5,897,729
[45] Date of Patent: Apr. 27, 1999

[54] PROCESS OF MAKING A STRUCTURE ENHANCING HOLLOW FIBER MODULE

[75] Inventors: Benjamin Bikson, Brookline; Salvatore Giglia, Norwood; Patrick Samuel Nicolas, Jr., Needham; Cheryl Ann Ford, Wareham, all of Mass.

[73] Assignee: Praxair Technology, Inc., Danbury, Conn.

[21] Appl. No.: 08/928,480

[22] Filed: Sep. 12, 1997

Related U.S. Application Data

[62] Division of application No. 08/625,671, Mar. 29, 1996, Pat. No. 5,702,601.

[51] Int. Cl.⁶ .................................................. B65H 81/00
[52] U.S. Cl. .................... 156/172; 156/173; 156/295; 210/321.8; 264/271.1; 242/444; 242/447.2
[58] Field of Search ................... 210/321.78, 321.79, 210/321.8, 321.76, 321.74, 321.85, 321.87, 497.1; 96/10; 264/271.1, DIG. 48; 242/430, 443.1, 444.2, 444, 447.2; 156/295, 292, 167, 172, 173

[56] References Cited

U.S. PATENT DOCUMENTS

| | | | |
|---|---|---|---|
| 3,422,008 | 1/1969 | McLain et al. . | |
| 3,690,465 | 9/1972 | McGinnis et al. . | |
| 3,755,034 | 8/1973 | Mahon et al. | 156/169 |
| 4,207,192 | 6/1980 | Coplan e al. . | |
| 4,336,138 | 6/1982 | Taniyama et al. . | |
| 4,350,549 | 9/1982 | Frehner | 156/161 |
| 4,368,124 | 1/1983 | Brumfield | 210/321.6 |
| 4,430,219 | 2/1984 | Kuzumoto et al. . | |
| 4,559,884 | 12/1985 | Stoldt et al. | 112/262.1 |
| 4,631,128 | 12/1986 | Coplan et al. . | |
| 4,781,834 | 11/1988 | Sekino et al. | 210/321.23 |
| 4,869,059 | 9/1989 | Austin . | |
| 4,881,955 | 11/1989 | Bikson et al. . | |
| 5,026,479 | 6/1991 | Bikson et al. | 210/321.8 |
| 5,160,042 | 11/1992 | Bikson et al. | 210/321.8 |
| 5,224,522 | 7/1993 | Baurmeister | 139/431 |
| 5,284,584 | 2/1994 | Huang et al. . | |
| 5,297,591 | 3/1994 | Baurmeister . | |
| 5,702,601 | 12/1997 | Bickson et al. | 210/321.79 |

FOREIGN PATENT DOCUMENTS

| | | |
|---|---|---|
| 0562520 | 9/1993 | European Pat. Off. . |
| H4201734 | 6/1992 | Japan . |

*Primary Examiner*—Ana Fortuna
*Attorney, Agent, or Firm*—Robert J. Follett

[57] ABSTRACT

The invention involves annular hollow fiber membrane bundle comprising a plurality of helically wound layers of semi-permeable hollow fibers helically wound thereon and at least one reinforcement filament which has been helically wound concurrently with said hollow fibers into the hollow fiber membrane bundle. A preferred embodiment provides that the reinforcement filament is uniformly distributed throughout the diameter of the bundle and/or across the axial length of the bundle. Though, other embodiments provide a non-uniform distribution throughout the diameter of the bundle and/or across the axial length of the bundle.

4 Claims, 6 Drawing Sheets

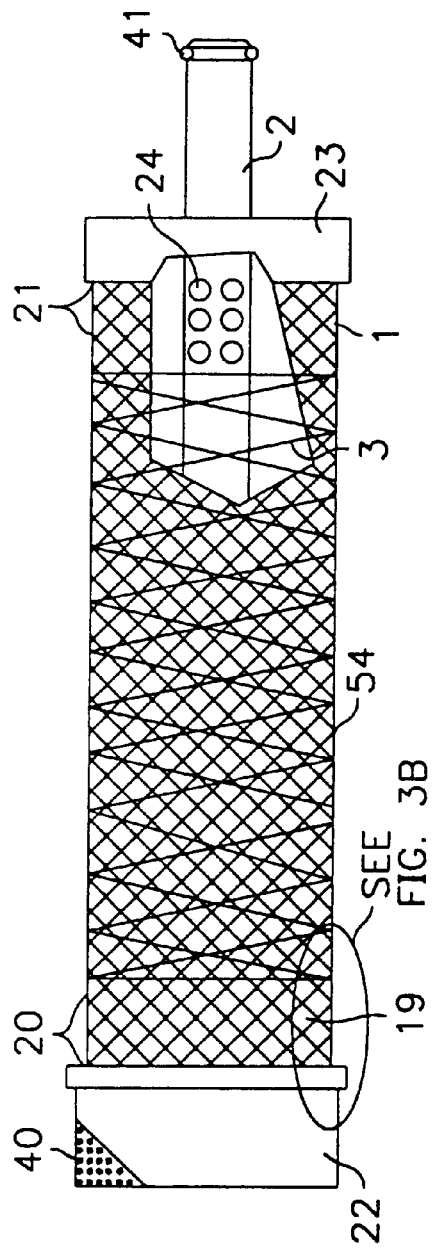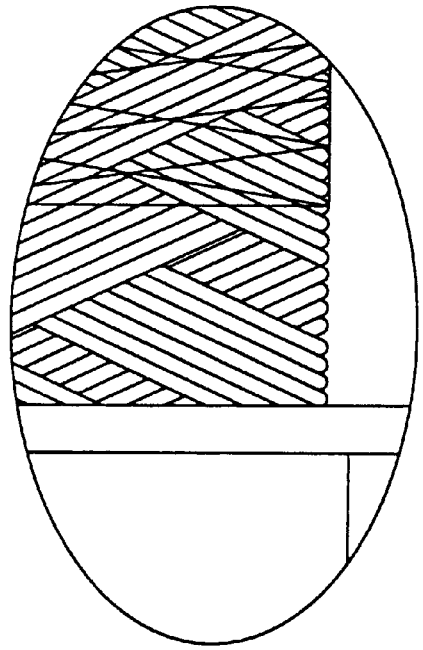
FIG. 3A
FIG. 3B

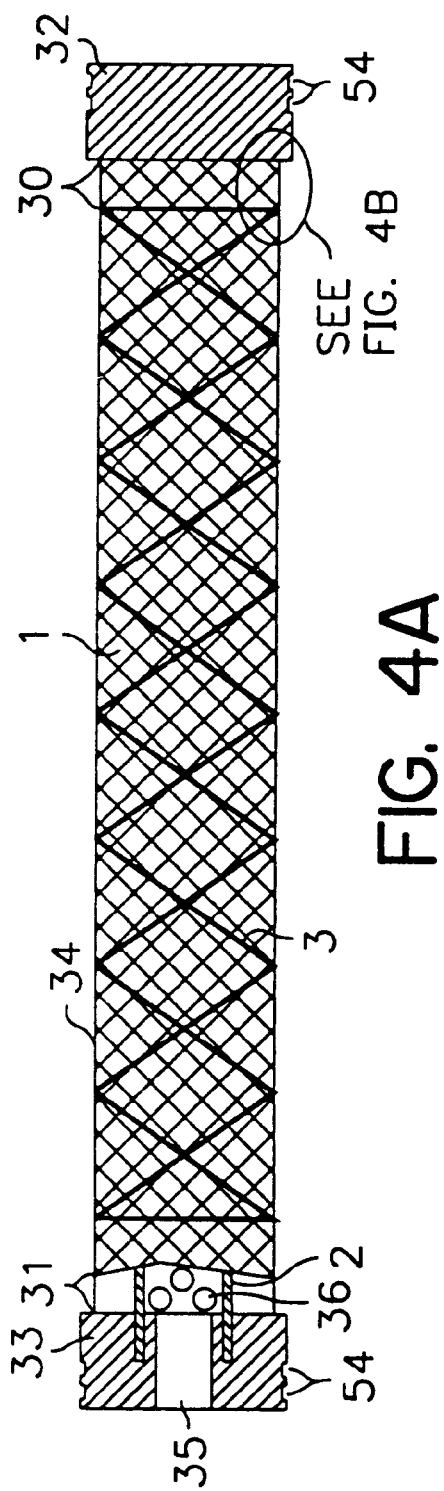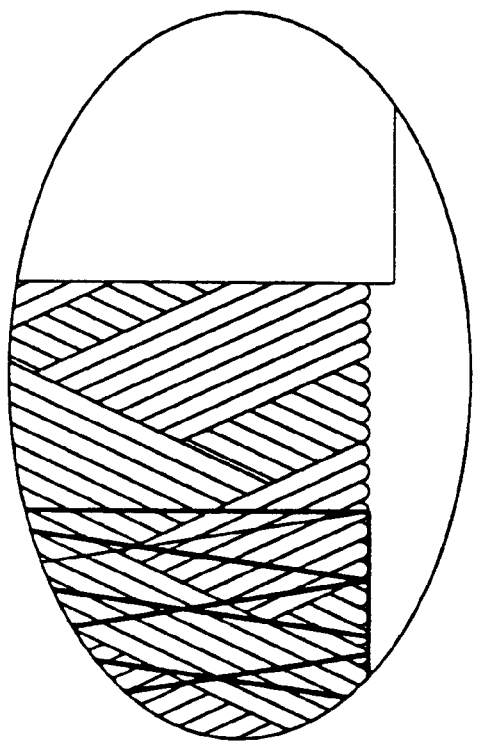
FIG. 4A
FIG. 4B

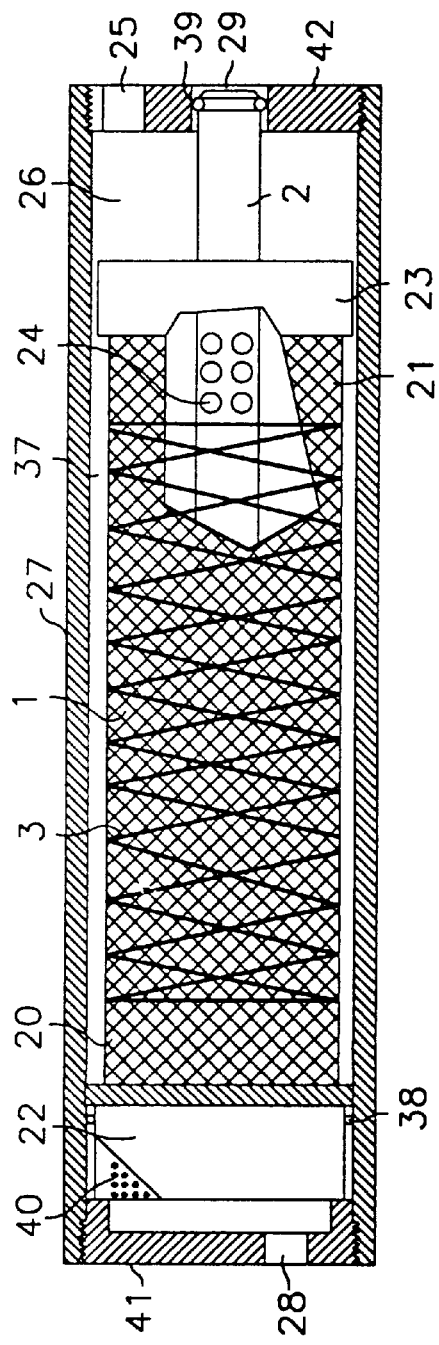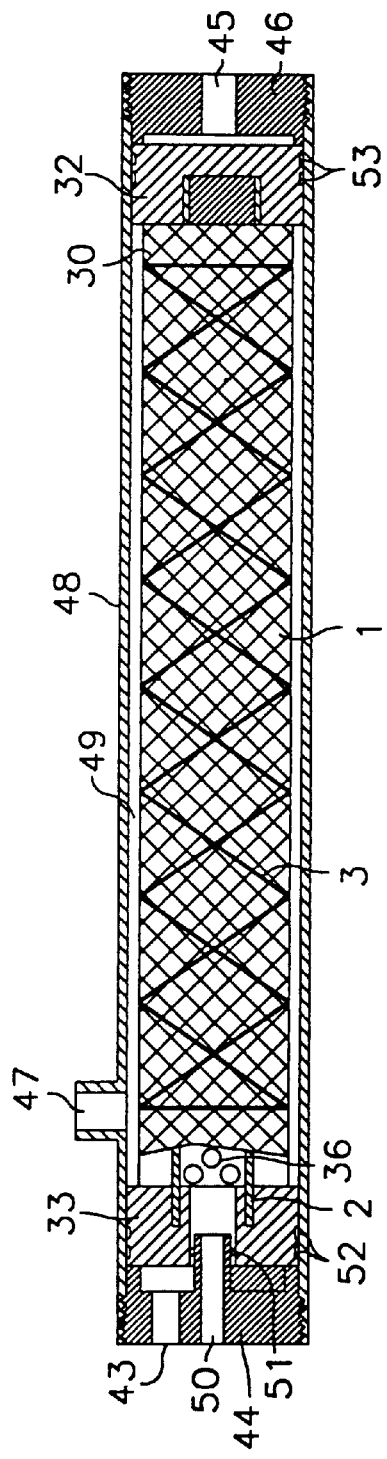

PROCESS OF MAKING A STRUCTURE ENHANCING HOLLOW FIBER MODULE

This is a Division of prior U.S. application: Ser. No. 08/625,671 Filing Date Mar. 29, 1996, now U.S. Pat. No. 5,702,601.

FIELD OF THE INVENTION

This invention is directed towards improved hollow fiber membrane modules used for the separation of a fluid component from a feed comprising a mixture of fluids. The term mixture of fluids refers to a mixture of liquids, mixtures of liquids and gases, and a mixture of gases. Such uses include gas separation, reverse osmosis and ultrafiltration to name a few. The modules of this invention are constructed from helically wound hollow fiber membranes and contain a single tubesheet, though the invention also contemplates modules that contain two tubesheets.

The invention is directed towards improved flow distribution in hollow fiber membrane modules. The invention is also directed towards increasing the structural stability and flow uniformity in helically wound hollow fiber membrane modules, especially in modules wherein the fibers are wound at high winding angles (e.g. angles which are greater than 45°).

BACKGROUND OF THE INVENTION

Hollow fiber devices for fluid separations are well known in the art. Such devices are used extensively in gas separation applications including hydrogen separation from refinery gas streams, acid gas separations from natural gas and nitrogen generation from air, and numerous liquid operations such as reverse osmosis desalination or dialyses processes to name a few. Hollow fiber membrane chemistry, morphology, module design and construction methods are optimized with respect to specific membrane separation application.

Improved flow distribution is frequently a major concern in design and construction of hollow fiber membrane devices. Uniform flow distribution without channeling or bypassing is frequently accomplished by controlled and uniform distribution of hollow fiber packing density. Examples of such hollow fiber construction methods can be found in U.S. Pat. Nos. 3,690,465, 3,755,034, 4,631,128, 4,881,955, 4,865,736 and 5,284,584 for example.

One particularly advantageous method of constructing hollow fiber devices with controlled and/or uniform distribution of packing density is by winding methods. A description of such methods can be found in, for example, U.S. Pat. No. 3,794,468, 4,207,192, 4,336,138, 4,631,128 and 4,881,955. U.S. Pat. No. 4,336,138 and 4,430,219 teach that one may wind a separate thread or tape into the module in the vicinity of the ends of the module in order to fix the hollow fibers to the core at the terminal portions. These references make no mention of using or extending the thread into other portions of the module.

In some separation applications it is particularly advantageous to construct wound hollow fiber devices with fibers wound at high wind angles, θ. The term "wind angle" is defined as follows: With a module in the horizontal position, the wind angle θ is defined as the angle at which the fiber is laid across the module with respect to the vertical axis. For example, fibers wound at a 90° wind angle would be parallel to the longitudinal axis of the module and straight from end to end on the module. Fibers wound in a module at the same wind angle will have the same fiber length. A high wind angle is one in which θ is greater than 45°. When bundles are constructed by winding hollow fibers at high winding angles as compared to low winding angles, the bore-side pressure drop is decreased in bundles of equal length. However, hollow fiber bundles wound at high wind angles can become structurally unstable when operated under high fluid linear velocity conditions on the shell side of the hollow fiber membrane, particularly when the treated fluids are viscous. Redistribution and shifting of hollow fibers can occur leading to flow channeling and bypassing.

Though wound hollow fiber devices exhibit improved and more uniform flow distribution characteristics, some flow maldistribution, such as entrance and exit flow nonuniformities, can still occur. Thus there still remains a need to increase structural stability and to further improve flow distribution in wound hollow fiber membrane devices.

OBJECTS OF THE INVENTION

One object of the present invention is to increase structural stability and flow uniformity in wound hollow fiber semipermeable membrane devices, in particular, wherein the fibers are wound at high winding angles. This object was accomplished by cowinding additional structure reinforcing filaments into the wound hollow fiber membrane structure. The structure reinforcing filaments are wound concurrently with the hollow fiber semipermeable membranes and are typically distributed uniformly throughout the diameter of the wound cartridge.

Another object of the present invention is to improve uniformity of flow distribution in axial flow hollow fiber membrane devices and, in particular, to minimize entrance and exit flow nonuniformities. This object was accomplished by cowinding a structure reinforcing filament into the wound hollow semipermeable fiber membrane structure wherein the reinforcing filament is excluded partially or completely from the cartridge regions designated as flow entrance and exit areas.

Another object of the present invention is to improve the structural strength of helically wound hollow fiber membrane module tubesheets by cowinding reinforcing filaments into the tubesheet sections of the bundles.

Another object of the present invention is to improve the structural stability and decrease the susceptibility of hollow fiber membranes to damage in the region immediately adjacent to the tubesheets. This objective was accomplished by cowinding reinforcing filaments, preferably coated with a soft resinous material, into the region immediately adjacent to the module tubesheets.

SUMMARY OF THE INVENTION

In one preferred embodiment the invention comprises an annular hollow fiber membrane module having a fluid separation area, and at least one tubesheet. The module is constructed from a plurality of helically wound layers of semi-permeable hollow fibers and at least one reinforcement filament that has been helically wound concurrently with said hollow fibers into the hollow fiber membrane module, wherein at least a portion of said reinforcement filament is in said fluid separation area.

A preferred embodiment provides that the reinforcement filament is uniformly distributed throughout the diameter of the module and/or across the axial length of the module. Though other embodiments provide a non-uniform distribution throughout the diameter of the module and/or across the axial length of the module.

Still another preferred embodiment provides a helically wound hollow fiber module with axial configuration for shell side flow wherein the cowound filament is partially or completely excluded from the fluid entrance and exit areas.

Still another embodiment provides that the wind angle of the reinforcement filament differs from the wind angle of the hollow fiber membrane filaments.

Other embodiments include reinforcement filaments that are coated with a lubricant or an adhesive layer. In addition, the invention contemplates a fluid separation apparatus that incorporates the modules of this invention reinforced with reinforcement filaments.

Still another embodiment provides for the winding of reinforcing filament(s) both into the tubesheet region for mechanical reinforcement, and across the axial length of the module.

Still another embodiment of this invention provides for winding reinforcing filament(s) into the narrow region immediately adjacent to the tubesheet or cap region. Preferably the reinforcing filament is coated with a soft resinous material to minimize hollow fiber membrane damage in this interfacial region and to provide improved fiber sealing in the tubesheet.

The invention also includes fluid separation apparatus which use the aforementioned bundles, as well as methods by which the bundles are formed.

BRIEF DESCRIPTION OF THE DRAWINGS

Other objects, features and advantages will become apparent to those skilled in the art from the following description of preferred embodiments and the accompanying drawings, in which:

FIGS. 3A, 3B show another embodiment of the hollow fiber module of this invention wherein the reinforcing filament is excluded from the feed flow exit and entrance regions.

FIGS. 4A, 4B show a sectional view of another embodiment of the hollow fiber module of this invention wherein the reinforcing filament is excluded from the fluid entrance and exit region.

FIG. 5 is a sectional view of a hollow fiber membrane separation apparatus which uses a hollow fiber module in accordance with an embodiment of the invention.

FIG. 6 is a sectional view of another embodiment of a hollow fiber membrane separation apparatus which uses sweep fluids and a hollow fiber module in accordance with the present invention.

DETAILED DESCRIPTION OF THE INVENTION

Figure 1:
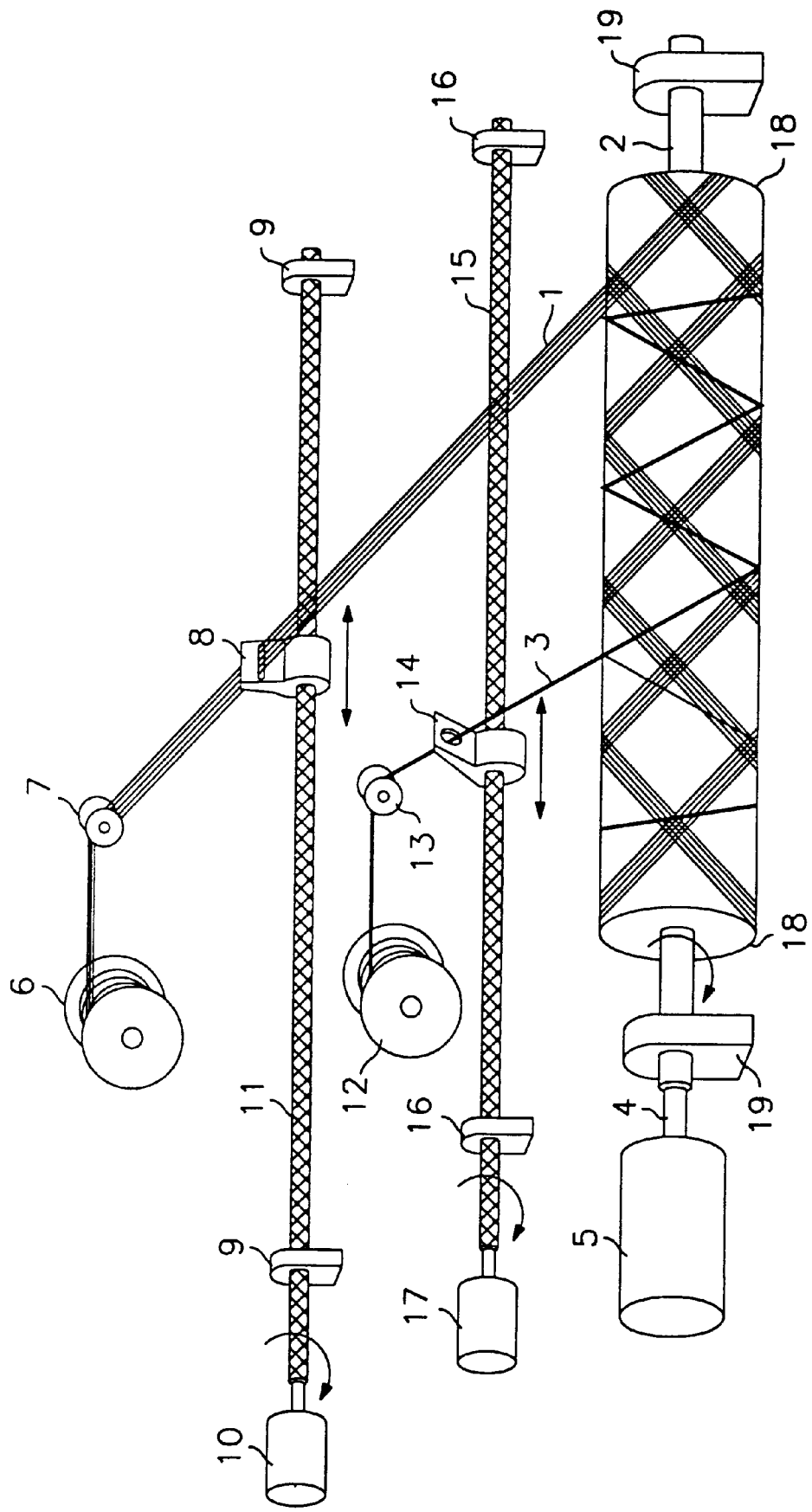
FIG. 1 shows an example of a winding arrangement of one embodiment of the present invention.

The structural integrity and the flow distribution in semipermeable hollow fiber membrane bundles can be improved substantially by cowinding a structure reinforcing filament(s) into helically wound hollow fiber membrane structure. The hollow fiber membranes of this invention can be wound by any method known in the art, in particular, such as described in U.S. Pat. No. 3,794,468; 4,631,128; 4,336,138, and 5,299,749.

Cylindrical bundles of semipermeable hollow fibers are typically wound by depositing consecutive layers of multiple filaments with each layer lying in generally parallel paths at a common angle to the longitudinal axis of the module. The bundles are preferably wound in such a way that consecutive layers of hollow fibers have substantially equal lengths so as to minimize shell-side and bore-side flow maldistribution. In a preferred embodiment, the reinforcing filament is wound from a separate, second fiber guide than that used for winding the hollow fiber membranes. This separate guide traverses the hollow fiber module from a first selected point to a second selected point and then in reverse. The winding is conducted concurrent with the winding of hollow fibers. The speed with which the second guide traverses the module between preselected points is optimized to provide maximum module reinforcing stability.

The reinforcing filament will be typically laid down at lower wind angles as compared to that of hollow fiber membranes. The points that limit the traverse of the filament guide may be from the first to the second module end or may be restricted to a predetermined section of the module. In one example of the latter case, the guide traverse will be limited to the central "active" section of the module (where fluid separation takes place) in between the module regions designated as shell-side fluid entrance and exit areas. Such arrangement will provide for lower packing density in exit and entrance regions of the module and for improved shell-side flow distribution in axial flow arrangements.

A preferred embodiment provides a helically wound hollow fiber module with axial configuration for shell side flow wherein the cowound filament is partially or completely excluded from the fluid entrance and exit areas. Such embodiments include bundles with shell side feed configuration with axial flow arrangement and permeate withdrawal on the hollow fiber bore side including embodiments that incorporate the introduction of a sweep fluid on the permeate side. Examples of bundles that employ such flow designs are described in U.S. Pat. Nos. 4,865,736 and 5,026,479.

Another preferred embodiment provides a helically wound hollow fiber module with bore side feed configuration and axial, preferably countercurrent, flow on the permeate (i.e., hollow fiber shell) side. Examples of bundles that employ such flow configuration are described in U.S. Pat. No. 4,881,955.

In the improvement of the present invention, a reinforcing filament is cowound concurrently with hollow fiber membranes to provide the reinforced module. In the preferred embodiment the cowound filament is partially or completely excluded from the permeate exit region.

Still another preferred embodiment provides a helically wound hollow fiber module with bore side feed configuration and axial countercurrent permeate flow configuration that incorporates the introduction of sweep fluid on the permeate side. Examples of bundles that employ such flow designs are described in U.S. Pat. No. 5,026,479. In the improvement of the present invention, a reinforcing filament is cowound concurrently with hollow fiber membranes. In the preferred embodiment the cowound filament is partially or completely excluded from the sweep fluid entrance and exit regions.

Still another embodiment provides a double ended helically wound hollow fiber module with shell side axial feed flow arrangement. The module contains two feed flow entrance regions and one nonpermeate exit region. The module with such flow arrangement is described in U.S. Pat. No. 5,160,042. In the improvement of the present invention, a reinforcing filament is cowound concurrently with hollow fiber membranes. In the preferred embodiment the cowound filament is completely or partially excluded from these entrance and exit regions.

Still another embodiment provides a helically wound hollow fiber module with radial shell side feed flow configuration. Examples of hollow fiber bundles with such flow arrangements are described in U.S. Pat. No. 3,870,637. The improvement comprises reinforcing the module by cowinding reinforcing filament throughout the entire module body or exterior layers of the module only.

In another embodiment of this invention two or more reinforcing filaments are deposited simultaneously in different module sections from independent guides. In one such example, two independently driven guides are utilized simultaneously wherein one guide is positioned to traverse between the first and the second end of the module while the second guide is positioned to traverse between the module areas designated as shell-side fluid entrance and exit areas. In hollow fiber bundles with multiple shell-side flow entrance and exit areas, multiple reinforcing filament guides can be employed for different regions of the module.

In another embodiment of this invention, two reinforcing filaments are wound simultaneously into the terminal sections of the module which are subsequently converted into tubesheets. In some embodiments, a potting material such as epoxy resin is deposited continuously into the terminal sections during winding. The reinforcing filament in this embodiment is designed to provide mechanical reinforcement and can be selected from carbon fibers, glass fibers, or other materials known in the art. A more preferred embodiment includes reinforcement fibers being cowound across the axial length of the module as well as in the tubesheet region.

The reinforcing filament is typically cowound continuously with hollow fiber membranes to provide for uniform filament distribution through the module diameter. However, in some embodiments the filament distribution throughout the module diameter can be nonuniform. Examples of such arrangements may include radial flow bundles wherein outer annular module layers only are reinforced by cowinding the filaments; or bundles with variable packing density of hollow fiber membranes through the annular layers. In the later example the packing density of the reinforcing filament in each annular layer is tailored to improved uniformity of packing density and thus improves uniformity of the flow. The semipermeable hollow fibers can be wound with a variable amount of interlacing or, conversely, without any interlacing, the latter arrangement is described in U.S. Pat. No. 5,299,749. The reinforcing filament is typically cowound with hollow fibers in such a way as to provide substantial interlacing for maximum reinforcement.

A single reinforcement filament or yarn can be cowound into a hollow fiber module. Alternatively multiple filaments can be cowound simultaneously from single or multiple guides. In the later case, the reinforcing filaments can be wound at different wind angles. The material of the filament or yarn is selected to be compatible with the specific fluid separation stream and the hollow fiber membranes.

Examples of reinforcing filaments include synthetic polymeric fibers such as polyesters, nylons, polypropylene, polyethylene, etc., and natural fibers such as cotton. Frequently, small diameter filaments are selected with diameters substantially lower than that of hollow fibers to minimize volume occupied by reinforcing filaments. Proper selection of reinforcing filament types and selection of winding conditions, such as filament tension, has to be carefully optimized to minimize possible damage to hollow fiber membranes. In one preferred embodiment, the hollow fiber module is constructed by winding hollow fibers with external diameters of 300 $\mu$ at an angle in the range of 50 to 60 degrees, while the 100 denier reinforcement filament comprised of Dacron® type 52 (DuPont) is cowound into the fiber module at an angle in the range of 10 to 30 degrees. The tension on the reinforcement filament is preferably 50 grams or less.

In some embodiments it can be advantageous to lubricate the reinforcing filament to minimize damage to hollow fiber membranes. The lubricant is selected so as not to affect adversely hollow fiber separation characteristics and, in some embodiments, is removed after completion of module winding by volatilization or washing.

In some embodiments, water soluble polymers such as polyvinyl alcohol, polyvinylpyrrolidone, etc., can be used as lubricants. These lubricants are removed advantageously by water washing after module construction is completed. Further examples of lubricants include silicon and paraffin oils and polydimethylsiloxane resins. These lubricants can be advantageously removed after module construction by washing with simple hydrocarbons such as hexane.

In another embodiment of this invention the reinforcing filament is permanently bonded to hollow fiber membranes to provide improved reinforcement. This is accomplished by providing reinforcing threads coated with a layer of adhesive that is about 10–100 microns thick. A variety of adhesive materials can be utilized such as epoxy and urethane resins and, in particular, hot melt thermoplastics having a melting point of less than 150° C. In the latter case, the improved bonding between reinforcing threads and hollow fiber membranes is induced by heat that is applied during the winding process or after the winding of the module is completed. The melt adhesive material is selected so as to have a melting temperature that is higher than the temperature of the fluid separation application the membrane module will be employed at, but lower than the temperature that is deleterious to hollow fiber membrane separation/permeation characteristics. Examples of such materials include EVA resins.

Reinforcement filaments coated with adhesives provide superior structural reinforcement by virtue of the bonding between the hollow fibers and reinforcement filaments. Due to this improved reinforcement provided by the adhesive coated filaments, the filament cowinding procedures are made more flexible. For example, the adhesive coated reinforcing filaments can be cowound at higher wind angles, potentially even higher than the hollow fiber membrane winding angles, while still providing adequate reinforcing characteristics. In some embodiments the melt adhesive coated filament is deposited simultaneously with the ribbon of hollow fiber membranes from the same fiber guide in a simplified winding procedure.

FIG. 1 illustrates one embodiment of the winding arrangement according to the present invention. Multiple hollow fiber membrane filaments 1 are laid down onto a cylindrical core pipe 2 in generally parallel helical paths at a common angle to the axis of the module. The core pipe supported by bearings 19 is attached to the drive shaft 4 which is driven by motor 5. The hollow fibers are supplied from spool 6 over a pulley wheel 7 to hollow fiber traverse guide 8 and then laid down onto core pipe 2. The traverse guide 8 is mounted on a helical gear shaft 11 supported by bearings 9 and is driven by motor 10. The traverse guide 8 is driven by rotations of shaft 11 and motor 10 back and forth along the core pipe 2.

Figure 2:
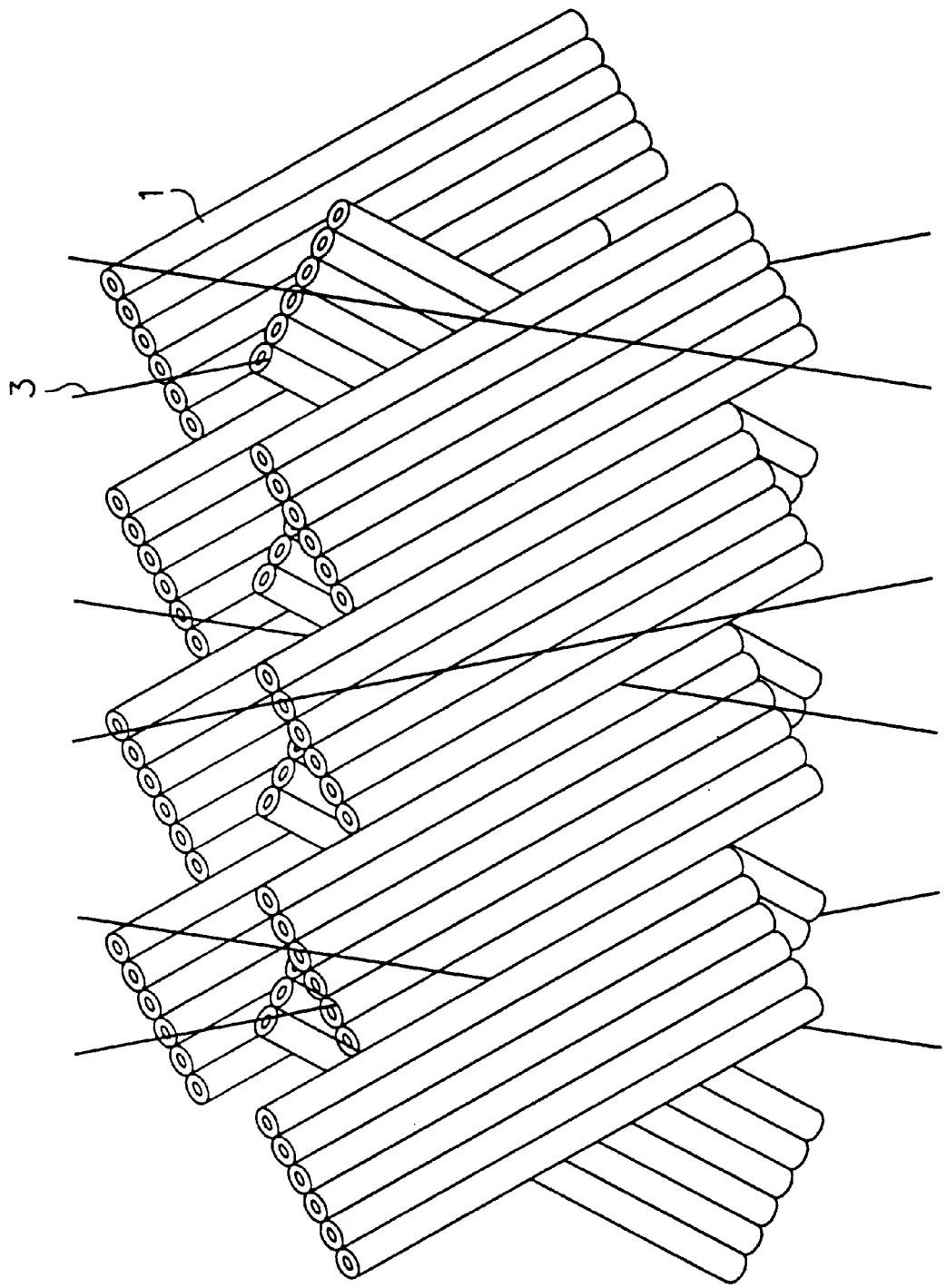
FIG. 2 is a schematic illustration of the interlacing of reinforcing filaments and hollow fibers according to an embodiment of the invention.

The reinforcing filament 3 is supplied from spool 12 over a pulley wheel 13 to the traverse guide 14 and then to the hollow fiber membrane module built on the core pipe 2. The traverse guide 14 is mounted on helical gear shaft 15 supported by bearings 16 and driven by motor 17. The traverse guide 14 is driven back and forth by rotations of shaft 15 and motor 17. At traverse points 18 at the end of the module, the hollow fiber filaments can be optionally secured by different means such as string or tape, for example as described in U.S. Pat. No. 4,430,219. FIG. 2 provides a schematic illustration of interlacing of reinforcing filament 3 and hollow fibers 1 wound according to the procedure described above. It should be noted that in some embodiments the core pipe 2 is not required such that the module is coreless. Methods of making such bundles are disclosed in U.S. Pat. No. 4,045,851 to Ashare et al.

The filament reinforced hollow fiber membrane bundles of this invention can be utilized in numerous separation applications such as gas separations, vapor removal and reverse osmosis among others. The module design and flow configuration can be selected to optimize the performance in the specific membrane separation application. The module designs with axial flow arrangements that are particularly useful for gas separation applications are disclosed in, for example, U.S. Pat. No. 4,781,834, 4,865,736, 4,881,955, 5,026,479 and 5,160,042. The use of the reinforced hollow fiber module of this invention is particularly useful in the aforementioned module designs.

FIG. 3 shows a fluid separation module 19 prepared according to one embodiment of this invention. Semipermeable hollow fiber membranes 1 are wound around the core pipe 2 to form the module. The hollow fiber module is reinforced by cowound filament 3 that is positioned between module regions designated as feed fluid entrance 20 and exit areas 21, respectively. The terminal ends of the hollow fiber bundles are encapsulated into resinous potting material. One end of the module is capped by the 20 potting material to provide for the terminal cap 23, while the second end of the module is encapsulated by a terminal tubesheet 22 that provides for separation of the high pressure feed and low pressure permeate sides. Fiber bore openings are created at an oblique plane in the tubesheet 22 as indicated at 40 to provide for permeate removal. Hollow fiber module 19 is encased by an impervious barrier 54 which may be a wrap of impervious film. The impervious barrier is placed so as to closely adhere to the external cylindrical surface of the module and encases the entire module surface except for a narrow region next to tubesheet 22 that provides for the feed fluid entrance region. The use of such barriers is shown in U.S. Pat. No. 4,781,834. The nonpermeate fluid is removed from the hollow fiber module via openings 24 provided in the core pipe 2. The openings are placed in a narrow region 21 adjacent to terminal cap 23 and distal from terminal tubesheet 22.

FIG. 4 is a sectional view of another embodiment of a hollow semi-permeable fiber membrane module in accordance with the present invention. Hollow fiber membranes 1 are wound around the core pipe 2 to form the module. The hollow fiber module is reinforced by cowound filament 3 that is positioned between the module regions designed as shell-side fluid entrance 30 and exit areas 31, respectively. The terminal ends of the module are encapsulated into resinous material to form tubesheets 32 and 33 that separate the bore side and the shell-side fluid streams. Both tubesheets contain grooves 54 for o-ring placement that serve to provide a fluid tight seal to the external cylindrical casing (not shown) and are further severed to open the hollow fiber bores. The hollow fiber module is encased by an impervious barrier 34, i.e., a wrap of impervious film. The impervious barrier closely adheres to and encases the external cylindrical surface of the module. The barrier encases the entire surface of the module between terminal tubesheets except for a narrow region next to the tubesheet 32 that provides for shell-side fluid passageway 30. A second shell-side fluid passageway 35 is provided through the terminal tubesheet 33 that is in direct communication with hollow fiber shell side via openings 36 provided in core pipe 2. The openings are formed in the core pipe 2 only in a narrow region adjacent to tubesheet 33 and distal from tubesheet 32.

Hollow fiber bundles shown in FIGS. 3 and 4 are improved in the distribution of flow of treated fluids with respect to radial direction of the flow in the entrance and exit regions of the module. In these embodiments the reinforcing threads were cowound into terminal ends of hollow fiber module and into substantially the entire active area of the hollow fiber module in between the tubesheet except for the narrow regions designated as entrance and exit areas 20, 21 in FIG. 3 and 30, 31 in FIG. 4. The dimensions of these exit and entrance regions will depend on the module size and characteristics of treated fluids but typically will be from about 3 cm to about 20 cm in length. The radial distribution of fluids in the entrance region and in the exit region of the module is made more efficient by lowering fiber packing density in these regions while maintaining good uniform axial flow conditions in the rest of the module.

FIG. 5 shows a sectional view of the membrane separation apparatus according to one embodiment of this invention for carrying out reverse osmosis or gas separations. The apparatus is equipped with the hollow fiber module of this invention as shown in FIG. 3. The fluid to be treated is supplied under pressure through entrance port 25 in the threaded end enclosure 42; it enters through conduit 26 into the annular passage 37 between the inner wall of the cylindrical container 27 and the outer module body 21; the fluid flows through module entrance 20 and is distributed in the radial direction near the resinous terminal end. The fluid is directed further in an axial, longitudinal direction between hollow fiber membranes 1 reinforced by the filament 3. The separation is effected in this section of the module with permeate fluid entering hollow fiber bores. The permeate fluid is further transported along the hollow fiber bores in a direction generally countercurrent to the feed flow direction; permeate exits through severed hollow fiber terminal ends 40 embedded into the resinous tubesheet 22 and through permeate exit port 28 in the threaded enclosure 41. The permeate and feed fluids are prevented from intermixing by o-ring seal 38. The nonpermeate fluid is transported radially through the hollow fiber module body close to the resinous cap 23, through the holes 24 provided in the core pipe 2 and into the nonpermeate exit port 29. O-ring 39 provides a fluid-tight seal between the core pipe 2 and the end closure 42.

FIG. 6 shows a sectional view of the membrane separation apparatus according to another embodiment of this invention for carrying separations utilizing sweep fluids. The apparatus is equipped with the hollow fiber module of this invention as shown in FIG. 4. The feed fluid to be treated is supplied through entrance port 43 in the threaded end enclosure 44 into open bores of hollow fibers 1 embedded in the resinous tubesheet 33. The fluid is directed along the active section of hollow fibers to effect the separation. The nonpermeate portion of the feed fluid exits the terminal end of hollow fibers embedded in the resinous tubesheet 32 and exits the separation apparatus through exit port 45 in the threaded end enclosure 46. The hollow fiber module is reinforced with filament 3. The sweep fluid enters the apparatus through port 47 in the cylindrical container 48 and flows through the annular passage 49 formed between the inner wall of the cylindrical container 48 and the outer surface of the hollow fiber package body. The sweep fluid enters the hollow fiber module through entrance region 30 and is distributed in a radial direction near the resinous tubesheet 32. The sweep fluid is then directed in an axial, longitudinal direction between the hollow fibers. The fluid direction being typically countercurrent to the direction of the feed fluid in the hollow fiber bores. The sweep fluid enriched by the permeate is transported in a radial direction through the hollow fiber module close to the resinous tubesheet 33 and into holes 36 provided in core pipe 2. The sweep and permeate fluids then exit the separation apparatus through exit port 50 in the threaded end enclosure 44. The shell side and bore-side fluids are prevented from intermixing by o-ring seals 51, 52 and 53.

In another embodiment of the present invention, the feed gas is introduced into the bores of a helically wound hollow fiber membrane cartridge with the permeate gas flow maintained in a countercurrent direction to the axis of feed and raffinate gas flow, as described in U.S. Pat. No. 4,881,955. A further improvement comprises cowinding of the reinforcing filament into the module body. Preferably the reinforcing filament or filaments are excluded from module segment designated as the permeate exit area adjacent to the terminal tubesheet.

Figure 7A:
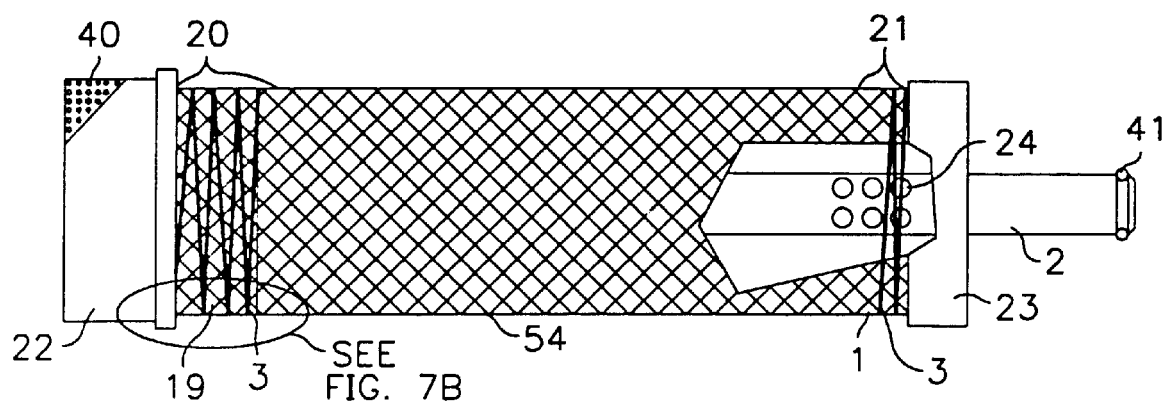
FIGS. 7A, 7B show another embodiment of the hollow fiber module of this invention wherein the reinforcing filament is wrapped adjacent to the tubesheet and cap areas.
Figure 7B:
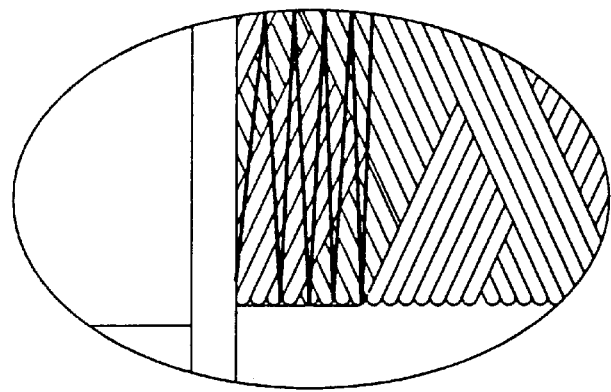

FIG. 7 shows a sectional view of another embodiment of the hollow fiber module of this invention wherein the impervious filament 3 is cowound into the hollow fiber module in the areas adjacent or contiguous to the tubesheet 22 and cap 29 (cap 29 may be replaced with a tubesheet). These areas are at an interface between fluid separation area and the tubesheet or cap. The reinforcement filament is preferably coated with a soft resinous material such as silicon rubber or soft epoxy resin, that is cured after the module winding is completed. The filaments, coated with a soft, resinous material such as a silicon rubber, protect the hollow fibers next to the tubesheet interface against damage, particularly under high fluid flow conditions in the module exit and entrance regions and improve the hollow fiber fluid-tight sealing in the tubesheet. The length of the region occupied by the impervious filaments is preferably less than about 5 cm, more preferably between about 1 cm to about 5 cm. The designation of the parts in FIG. 7 is identical to that in FIG. 3.

Specific features of the invention are shown in one or more of the drawings for convenience only, as each feature may be combined with other features in accordance with the invention. The present invention has been fully disclosed in a number of embodiments. The embodiments should not be construed as limiting and those skilled in the art will realize other embodiments of the present invention.

What is claimed is:

1. A process for making an annular fluid separation hollow fiber membrane module having first and second ends and a fluid separation area therebetween, and fluid entrance and exit regions, said process comprising:

a) helically winding a plurality of layers of semipermeable hollow fibers about a cylindrical core pipe, while concurrently b) helically winding and at least one reinforcement filament into the hollow fiber membrane module, wherein at least a portion of said reinforcement filament is wound in between said first and second ends, and wherein said at least one reinforcement filament is wound at a different wind angle than the hollow fibers.

2. The process according to claim 1, wherein said hollow fibers are fed onto said cylindrical core pipe from a different guide than that which is used for said at least one reinforcement fiber.

3. The process according to claim 1, wherein at least one of said ends is encapsulated in a resinous material, and wherein said at least one reinforcement filament is helically wound concurrently with said hollow fibers into said hollow fiber membrane module in an area which is an interface between said fluid separation area and said encapsulated end or ends.

4. The process according to claim 1, wherein said membrane module has a fluid separation area and at least one section which is subsequently converted into a tubesheet, and wherein said at least one reinforcement filament is wound only into said at least one section that is subsequently converted into a tubesheet.

* * * * *